United States Patent [19]

Morimura et al.

[11] 4,321,374

[45] Mar. 23, 1982

[54] TRIAZINE DERIVATIVES

[75] Inventors: Syoji Morimura, Yokohama; Toshimasa Toda; Tomoyuki Kurumada, both of Hiromachi, all of Japan

[73] Assignee: Sankyo Company, Limited, Tokyo, Japan

[21] Appl. No.: 156,020

[22] Filed: Jun. 3, 1980

[30] Foreign Application Priority Data

Jun. 23, 1979 [JP] Japan ................. 54/79419

[51] Int. Cl.$^3$ ............................ C07D 401/14
[52] U.S. Cl. .................................. 544/198
[58] Field of Search ........................ 544/198

[56] References Cited

U.S. PATENT DOCUMENTS

| | | | |
|---|---|---|---|
| 3,925,376 | 12/1975 | Chalmers et al. | 544/198 X |
| 4,028,334 | 6/1977 | Chalmers et al. | 544/198 |
| 4,086,204 | 4/1978 | Cassandrini et al. | 544/198 |
| 4,108,829 | 8/1978 | Cassandrini et al. | 544/198 X |
| 4,166,813 | 9/1979 | Soma et al. | 544/198 X |

FOREIGN PATENT DOCUMENTS 2754 7/1979 European Pat. Off. ............ 544/198

Primary Examiner—John M. Ford
Attorney, Agent, or Firm—Toren, McGeady & Stanger

[57] ABSTRACT

Novel triazine derivatives represented by the general formula (I) and use thereof as light stabilizers for synthetic polymers are described.

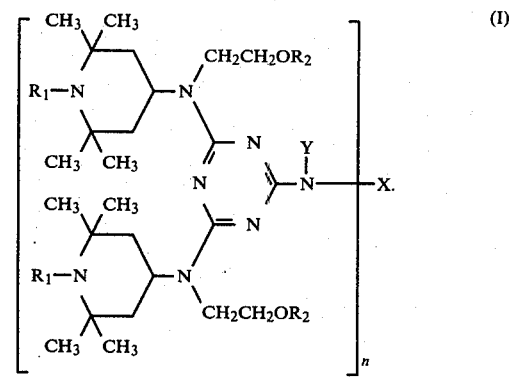

The compounds are distinguished by an improved stabilizing effect in various synthetic polymer compositions, such as polyolefins, against light- and/or heat-induced deterioration thereof, low volatility upon heat-processing or during storage of shaped articles containing the compounds, and resistance to extraction with water and solvents.

6 Claims, No Drawings

TRIAZINE DERIVATIVES

The present invention relates to novel triazine derivatives and their use as stabilizers for synthetic polymers.

Certain s-triazine derivatives which have substituents containing at least one 2,2,6,6-tetramethyl-4-piperidyl group are disclosed in U.S. Pat. No. 3,925,376. These compounds are effective stabilizers for polymeric materials, in particular against light degradation of polyolefins.

For specific applications, however, these triazine derivatives have too high volatility and tendency to migrate.

This is in particular the case when the plastic is used in thin layers, for example, in fibres, films or lacquers, and stabilization over a relatively long period is required.

Attempts have been made to increase the molecular weight of such triazine-piperidine derivatives and thereby to lower their volatility and tendency to migrate. In U.S. Pat. No. 4,108,829, for example, it is proposed to link several piperidine-substituted triazine groups via a polyvalent compound, e.g., a polyamine. In U.S. Pat. No. 4,086,204 and German Offenlegungsschrift No. 27 52 740, piperidine-substituted polycondensation products of difunctional triazine derivatives are proposed as stabilizers. Polytriazines of this type also form a physical mixture with the polymeric materials to be stabilized and can be used. It is difficult, however, to produce constantly homogeneous stabilizers comprising such a polymer compound.

The object of the invention is to provide stabilizers which are based on piperidine-triazine derivatives having 2-hydroxyethyl group and which can closely be dissolved in the polymers to be protected and thus cannot be removed from the polymers either by migration or by elution.

The present stabilizer comprises novel compound having the formula

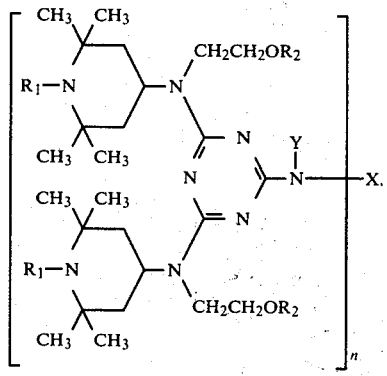

[wherein
$R_1$ represents hydrogen atom or methyl group,
$R_2$ represents hydrogen atom, an alkanoyl group having from 2 to 18 carbon atoms or 3-(3,5-di-tert-butyl-4-hydroxyphenyl)propionyl group,
n is 1 or 2,
when n is 1,
X represents an alkyl group having from 1 to 18 carbon atoms, benzyl group or a group of the formula—$CH_2CH_2OR_2$ (wherein $R_2$ is as defined above) and
Y represents hydrogen atom, a group of the formula

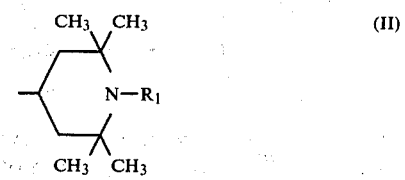

or a group of the formula

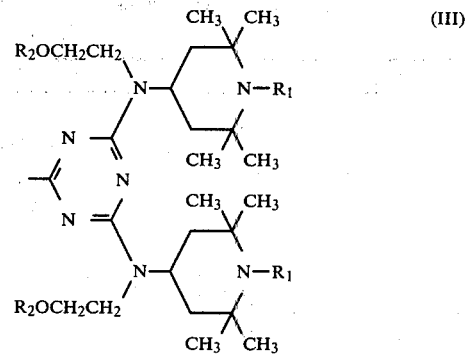

(wherein $R_1$ and $R_2$ are as defined above),
when n is 2,
X represents an alkylene group having from 2 to 6 carbon atoms, xylylene group or a group of the formula

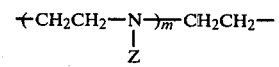

(wherein
m is an integer from 1 to 4 and Z represents a group of the above formula (III)) and
Y represents hydrogen atom or a group of the above formula (II)].

In the formula (I), $R_2$ as an alkanoyl group having from 2 to 18 carbon atoms can be, for example, acetyl, propionyl, butyryl, hexanoyl, octanoyl, lauroyl, palmitoyl or stearoyl, in particular, it is desirably an alkanoyl group having from 2 to 4 carbon atoms. X as an alkyl group having from 1 to 18 carbon atoms can be a straight or branched chain alkyl, for example, methyl, ethyl, propyl, isopropyl butyl, isobutyl, tert-butyl, hexyl, octyl, 2-ethylhexyl, tert-octyl, decyl, dodecyl, tetradecyl or octadecyl, in particular, it is desirably an alkyl group having from 8 to 18 carbon atoms. X as an alkylene group having from 2 to 6 carbon atoms can be, for example, 1,2-ethylene, 1,2-propylene, 1,4-butylene or 1,6-hexylene, desirably 1,6-hexylene.

Preferred compounds of the formula (I) are those in which $R_1$ is hydrogen atom or $R_2$ is hydrogen atom. More preferred compounds of the formula (I) are those in which (1) $R_1$ and $R_2$ are hydrogen atom, n is 1, X is an alkyl group having from 8 to 10 carbon atoms and Y is hydrogen atom or 2,4-bis{2-hydroxy-N-(2,2,6,6-tetramethyl-4-piperidyl)ethylamino}-1,3,5-triazine-6-yl group;

(2) $R_1$ and $R_2$ are hydrogen atom, n is 1, X is 2-hydroxyethyl group and Y is 2,2,6,6-tetramethyl-4-piperidyl group;

(3) $R_1$ and $R_2$ are hydrogen atom, n is 2, X is 1,6-hexylene group or a group of the formula $$-(-CH_2CH_2-N\underset{Z}{)_{\overline{m}}}CH_2CH_2-$$

(wherein m is an integer from 1 to 4 and Z is 2,4-bis{2-hydroxy-N-(2,2,6,6-tetramethyl-4-piperidyl)ethylamino}-1,3,5-triazine-6-yl group) and Y is hydrogen atom.

Examples of compounds of the formula I in which n is 1 are given in the following table:

| No. | $R_1$ | $R_2$ | X | Y |
|---|---|---|---|---|
| 22 | H | H | $-(CH_2)_2-$ | H |
| 23 | H | H | $-(CH_2)_6-$ | H |
| 24 | $CH_3$ | H | " | H |
| 25 | H | H | 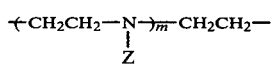 | H |
| 26 | H | H | $-CH_2CH_2-\underset{A}{N}-CH_2CH_2-$ | H |
| 27 | H | H | $-(CH_2CH_2-\underset{A}{N})_{\overline{2}}CH_2CH_2-$ | H |
| 28 | H | H | $-(CH_2CH_2-\underset{A}{N})_{\overline{4}}CH_2CH_2-$ | H |

| No. | $R_1$ | $R_2$ | X | Y |
|---|---|---|---|---|
| 1 | H | H | $-C_4H_9$ | H |
| 2 | H | H | $-C_8H_{17}$ | H |
| 3 | H | H | $-t-C_8H_{17}$ | H |
| 4 | H | H | $-CH_2\underset{C_2H_5}{CH}(CH_2)_3CH_3$ | H |
| 5 | H | H | $-C_{10}H_{21}$ | H |
| 6 | H | H | $-C_{12}H_{25}$ | H |
| 7 | $CH_3$ | H | " | H |
| 8 | H | H | $-C_{18}H_{37}$ | H |
| 9 | H | H | $-CH_2-\bigcirc$ | H |
| 10 | H | H | $-CH_2CH_2OH$ | H |
| 11 | H | H | " | 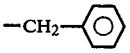 |
| 12 | $CH_3$ | H | " | 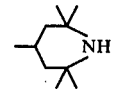 |
| 13 | H | $-COCH_3$ | $-CH_2CH_2OCOCH_3$ | 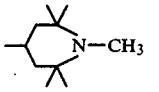 |
| 14 | H | $-COC_{11}H_{23}$ | $-CH_2CH_2OCOC_{11}H_{23}$ | " |
| 15 | H | $-COC_{17}H_{35}$ | $-CH_2CH_2OCOC_{17}H_{35}$ | " |
| 16 | H | $-COCH_2CH_2-\underset{C(CH_3)_3}{\overset{C(CH_3)_3}{\bigcirc}}-OH$ | $-CH_2CH_2OCOCH_2CH_2-\underset{C(CH_3)_3}{\overset{C(CH_3)_3}{\bigcirc}}-OH$ | " |
| 17 | H | H | $-C_8H_{17}$ | " |
| 18 | H | H | " | 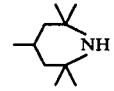 |
| 19 | H | H | $-C_{12}H_{25}$ | " |
| 20 | H | H | $-C_{18}H_{37}$ | " |
| 21 | H | H | $-CH_2CH_2OH$ | " |

Examples of the compounds of the formula (I) in which n is 2 are given in the following table:

-continued

| No. | R₁ | R₂ | X | Y |
|-----|----|----|---|---|
| 29 | H | H | $+CH_2)_6$ |  |

Note: The group A is the formula of

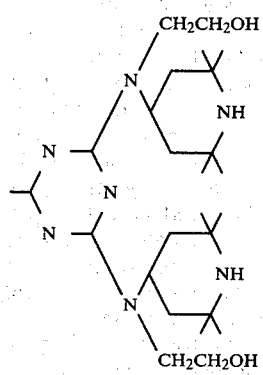

The compounds of the formula (I) can be prepared by the following methods:

(1) The compound (V) having the formula (I) in which R₁ and R₂ are hydrogen atom, Y is hydrogen atom or 2,2,6,6-tetramethyl-4-piperidyl group and n is 1 or 2 may be prepared by (a) reacting cyanuric chloride with at least twice molar amounts of 4-(2-hydroxyethylamino)-2,2,6,6-tetramethylpiperidine in an inert solvent in the presence or absence of a fixing agent of hydrogen chloride at temperatures from room temperature to a boiling temperature of the solvent used, preferably at 50°–130° C. to give the compound having the formula

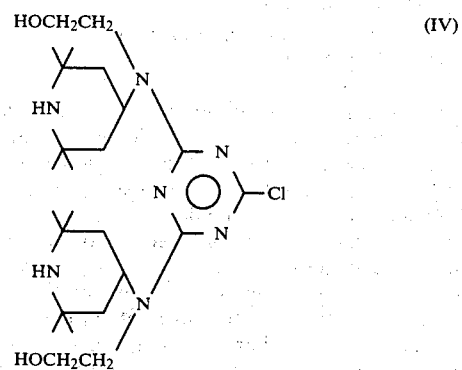 (IV)

(b) reacting the latter compound with an amine of the formula

in an inert solvent or without solvent in the presence or absence of a fixing agent of hydrogen chloride at temperatures from room temperature to 200° C., preferably at 50°–150° C. to afford the compound of the formula

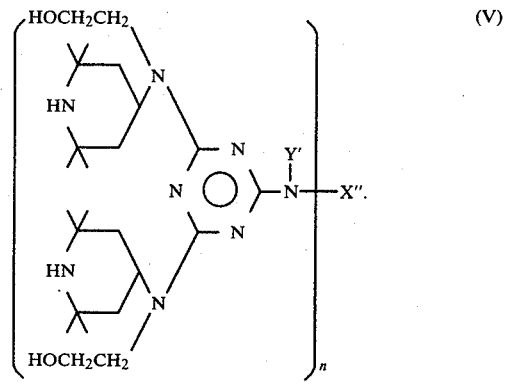 (V)

In the above formulae, X', if n is 1, is $C_{1-18}$ alkyl, benzyl or 2-hydroxyethyl and, if n is 2, is $C_{2-6}$ alkylene, xylylene or a group of the formula

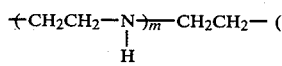

(wherein m is an integer of 1 to 4). X", if n is 1, is the same meaning as in X' and, if n is 2, is $C_{2-6}$ alkylene, xylylene or a group of the formula

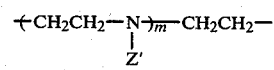

(wherein m is an integer of 1 to 4 and Z' is a group of the formula (III) in which R₁ and R₂ are hydrogen atoms). Y' is hydrogen atom or 2,2,6,6-tetramethyl-4-piperidyl group. If n is 2 and X" is a group of the formula

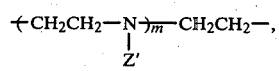

then 2 plus m moles or more of the compound of the formula (IV) should be used based on one mole of the amine.

(2) The compound (VII) having the formula (I) in which R₁ and R₂ are hydrogen atoms, Y is a group of the formula (III) wherein R₁ and R₂ are hydrogen atoms and n is 1 may be prepared by (a) reacting an amine of the formula H₂NX' with at least twice molar amounts of cyanuric chloride in an inert solvent in the presence of absence of a fixing agent of hydrogen chloride under ice-cooling or below a boiling temperature of the solvent used, preferably at 10°–70° C. to give the compound of the formula

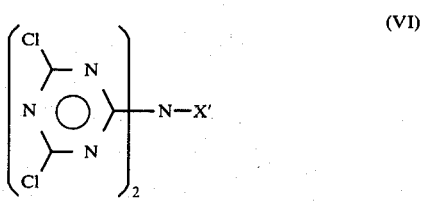 (VI)

(b) reacting the latter compound with 4-(2-hydroxyethylamino)-2,2,6,6-tetramethylpiperidine in the same reaction conditions as in the above step (1) - (b) to afford the compound of the formula

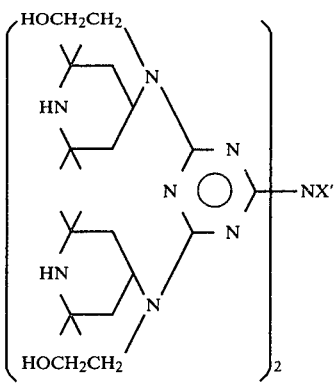

(VII)

In the above formula, X', if n is 1, is the same meaning as above. In the above methods, there may be used, as a reaction solvent in the steps (1) - (a) and (2)-(a), benzene, toluene, xylene, acetone, dioxane and the like. As a reaction solvent in the steps (1)-(b) and (2)-(b), there may be used water, dioxane, diethylene glycol, diethyl ether, acetone, dimethylformamide, dimethylacetamide, n-hexane, n-heptane benzene, toluene, xylene, an absolute or aqueous alcohol such as methanol, ethanol or t-butanol, preferably acetone, benzene, xylene, toluene or an alcohol. As the fixing agent of hydrogen chloride, there may be used triethylamine, sodium or potassium hydroxide, potassium carbonate, sodium hydrogen carbonate and the like.

(3) The compound of the formula (V) in which Y' is 2,2,6,6-tetramethyl-4-piperidyl group and X" is 2-hydroxyethyl group can be prepared by one step according to the method (1)-(a) using excess amounts of 4-(2-hydroxyethylamino)-2,2,6,6-tetramethylpiperidine under reflux.

(4) The compound of the formula (I) in which $R_1$ is methyl can be prepared by reacting the compound of the formula (IV), in case where Y' is hydrogen in the formula (V), or the compound of the formula (V) or (VII), in case where Y" is other than hydrogen atom, with formaldehyde and formic acid.

(5) The compound of the formula (I) in which $R_2$ is acyl group as hereinbefore defined can be prepared by reacting the compound of the formulae (V) or (VII) with the desired carboxylic acid lower alkyl ester.

The compounds represented by the formula (I) are readily soluble in most organic polymers and even in small concentrations effect stabilization of the polymers against ageing, especially against photochemical degradation. Examples of polymers which are usually damaged by the action of light and can be stabilized by the addition of compounds of the formula (I) are as follows:

1. Polymers of mono- and di-olefins, for example, polyethylene (which can be crosslinked), polypropylene, polyisobutylene, polymethylbut-1-ene, polymethylpent-1-ene, polyisoprene or polybutadiene.

2. Mixtures of the polymers mentioned under (1), for example, mixtures of polypropylene with polyethylene or with polyisobutylene.

3. Copolymers of mono- and di-olefins, for example, ethylene/propylene copolymers, propylene/but-1-ene copolymers, propylene/isobutylene copolymers and ethylene/but-1-ene copolymers and also terpolymers of ethylene with propylene and a diene, such as hexadiene, dicyclopentadiene or ethylidenenorbornene.

4. Polystyrene.

5. Copolymers of styrene or α-methylstyrene with dienes or acrylic derivatives, for example, styrene/butadiene, styrene/acrylonitrile or styrene/acrylonitrile/methyl acrylate; mixtures of high impact strength obtained from styrene copolymers and another polymer, for example, a polyacrylate, a diene polymer or an ethylene/propylene/diene terpolymer; and also block copolymers of styrene, for example, styrene/butadiene/styrene, styrene/isoprene/styrene or styrene/ethylene-butylene/styrene.

6. Graft copolymers of styrene, for example, styrene on polybutadiene, styrene and acrylonitrile on polybutadiene and mixtures thereof with the copolymers listed under (5), such as those known as ABS polymers.

7. Halogen-containing polymers, for example, polyvinyl chloride, polyvinylidene chloride, polyvinyl fluoride, polychloroprene, chlorinated rubbers and halogen-containing copolymers such as vinyl chloride/vinylidene chloride, vinyl chloride/vinyl acetate or vinylidene chloride/vinyl acetate.

8. Polymers which are derived from α,β-unsaturated acids and their derivatives, such as polyacrylates and polymethacrylates, polyacrylamides and polyacrylonitrile.

9. Polymers which are derived from unsaturated alcohols and amines or their acyl derivatives or acetals, such as polyvinyl alcohol; polyvinyl acetate, polyvinyl stearate, polyvinyl benzoate, polyvinyl maleate, polyvinylbutyral, polyallyl phthalate, polyallylmelamine and their copolymers with other vinyl compounds, such as ethylene/vinyl acetate copolymers.

10. Homo- and co-polymers of epoxides, such as polyethylene oxide, polypropylene oxide or their copolymers with bis-glycidyl ethers.

11. Polyacetals, such as polyoxymethylene, and also those polyoxymethylenes which contain ethylene oxide as the comonomer.

12. Polyphenylene oxides.

13. Polyurethanes and polyureas.

14. Polycarbonates.

15. Polysulphones.

16. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.

17. Polyesters which are derived from dicarboxylic acids and dialcohols and/or from hydroxycarboxylic acids or the corresponding lactones, such as polyethylene terephthalate, polybutylene terephthalate and poly-1,4-dimethylolcyclohexane terephthalate, and also block polyetheresters which are derived from polyethers with hydroxyl end groups and dicarboxylic acids.

18. Crosslinked polymers which are derived from aldehydes on the one hand and from phenols, ureas and melamines on the other hand, such as phenol-formaldehyde resins, urea-formaldehyde resins and melamine-formaldehyde resins.

19. Alkyd resins, such as glycerol/phthalic acid resins and their mixtures with melamine-formaldehyde resins.

20. Unsaturated polyester resins which are derived from copolyesters of saturated and unsaturated dicarboxylic acids with polyhydric alcohols and vinyl compounds as crosslinking agents, and also their halogen-containing modifications of low combustibility.

21. Crosslinked epoxy resins which are derived from polyepoxides, for example, from bis-glycidyl ethers or from cycloaliphatic diepoxides.

22. Silicon resins, chlorinated polyehtylene/acrylonitrile/styrene resins, polyimides, polyamide-imides and polyaminobismaleimides.

The stabilizers according to the invention are added to the polymers in an amount of 0.01 to 5% by weight, based on the polymer. Preferably 0.02 to 1% by weight is used. The stabilizer is added before shaping of the polymeric materials. This addition can be effected by dry mixing of the pulverized materials or by mixing with a solution or melt of the polymer. The stabilizer can also be mixed into prepolymers or a solution thereof. Such prepolymers are used in particular as surface-coating resins, as coating compositions or as compression moulding compositions, which are converted to the cross-linked high-molecular state only during or after shaping.

Simultaneously with the admixture of the stabilizer of the invention, it is also possible to mix in those other additives conventionally employed in the processing of plastics. Such additives are, for example, pigments, fillers, plasticizers, detergents, glass fibres, fluorescent whitening agents, other stabilizers, flame retardants or antistatic agents.

When concurrently employing other known stabilizers, synergistic effects can be obtained; a co-stabilizer effect of this type can result, for example, with light stabilizers based on benzotriazole or benzophenone or based on nickel compounds.

The plastics stabilized in this way can be used in very diverse forms, for example, as films, fibres, tapes, compression moulding compositions, coating compositions or paints.

The following examples are given to illustrate the compounds of this invention and their use as stabilizers, but are not to be construed as limiting the scope of this invention.

EXAMPLE 1

2,4-Bis{2-hydroxy-N-(2,2,6,6-tetramethyl-4-piperidyl)ethylamino}-6-n-octylamino-1,3,5-triazine A solution of 4-(2-hydroxyethylamino)-2,2,6,6-tetramethylpiperidine (66 g) in dioxane (600 ml) was kept at 30°–40° C. and to the solution was added dropwise a solution of cyanuric chloride (27.8 g) in dioxane (200 ml). After completion of the addition, the reaction was conducted for an hour at temperatures from 35° C. to 40° C. The reaction mixture was refluxed for another 2 hours. The precipitated product was collected by filtration, placed in ice-aqueous ammonia and extracted with chloroform. The extract was dried over magnesium sulfate and chloroform was distilled off to yield white crystals, which were washed with hot ethyl acetate and dried to give 2,4-bis{2-hydroxy-N-(2,2,6,6-tetramethyl-4-piperidyl)ethylamino}-6-chloro-1,3,5-triazine as white crystals with a melting point of 206°–207° C.

The said product (7.7 g) and n-octylamine (3.0 g) were dissolved in dioxane (200 ml) and the solution was refluxed for 4 hours. After completion of the reaction, dioxane was distilled off and the resulting residue was poured into a 5% aqueous sodium hydroxide solution and extracted with ethyl acetate. The extract was dried over sodium sulfate and ethyl acetate was distilled off to yield white crystals, which were recrystallized from n-hexane to afford the desired product as white crystals with a melting point of 117°–119° C.

EXAMPLE 2

2,4-Bis{2-hydroxy-N-(2,2,6,6-tetramethyl-4-piperidyl)ethylamino}-6-n-decylamino-1,3,5-triazine 2,4-Bis{2-hydroxy-N-(2,2,6,6-tetramethyl-4-piperidyl)ethylamino}-6-chloro-1,3,5-triazine (3.0 g) and n-decylamine (1.5 g) were dissolved in dioxane (70 ml), followed by addition of potassium carbonate (1.0 g). The mixture was refluxed for 5 hours with stirring. After completion of the reaction, dioxane was distilled off and the resulting residue was recrystallized from ligroin to give the desired product as white crystals melting at 106°–107° C.

EXAMPLE 3

2,4-Bis{2-hydroxy-N-(2,2,6,6-tetramethyl-4-piperidyl)ethylamino}-6-n-dodecylamino-1,3,5-triazine Following the procedure of Example 1, 2,4-bis{2-hydroxy-N-(2,2,6,6-tetramethyl-4-piperidyl)ethylamino}-6-chloro-1,3,5-triazine (5.2 g) was reacted with dodecylamine (2.8 g) to afford an oily product. It was treated with alumina column chromatography (eluent=ethyl acetate:methanol=10:1) and the resulting crystals were recrystallized from n-hexane to afford the desired product as white crystals melting at 107°–109° C.

EXAMPLE 4

2,4-Bis{2-hydroxy-N-(2,2,6,6-tetramethyl-4-piperidyl)ethylamino}-6-n-octadecylamino-1,3,5-triazine Following the procedure of Example 3, the desired product was obtained as white crystals with a melting point of 104°–107° C.

EXAMPLE 5

2,4-Bis{2-hydroxy-N-(2,2,6,6-tetramethyl-4-piperidyl)ethylamino}-6-benzylamino-1,3,5-triazine 2,4-Bis{2-hydroxy-N-(2,2,6,6-tetramethyl-4-piperidyl)ethylamino}-6-chloro-1,3,5-triazine (5.0 g) was reacted with benzylamine (25.0 g) for 8 hours and 30 minutes at 150°–160° C. The reaction mixture was poured into an aqueous ammonia solution, extracted with chloroform and dried over anhydrous potassium carbonate and chloroform was distilled off. The resulting residue was treated with silica gel chromatography (eluent=ethyl acetate:triethylamine:ethanol=10:12:3) to yield crystals, which were recrystallized from cyclohexane to afford the desired product as white crystals melting at 88° C.

EXAMPLE 6

N,N'-Bis[2,4-bis{2-hydroxy-N-(2,2,6,6-tetramethyl-4-piperidyl)ethylamino}-1,3,5-triazine-6-yl]-hexamethylenediamine 2,4-Bis{2-hydroxy-N-(2,2,6,6-tetramethyl-4-piperidyl)ethylamino}-6-chloro-1,3,5-triazine (20.5 g) and hexamethylenediamine (2.0 g) were dissolved in xylene (700 ml), and the mixture was refluxed for 12 hours. The xylene was distilled off from the reaction mixture, and the residue was put into aqueous ammonia, extracted with chloroform and dried over anhydrous magnesium sulfate. The residue obtained by removing the chloroform was chromatographed through silica gel (eluent=ethyl acetate:triethylamine:ethanol=5:1:5), giving the desired product as white crystals with a melting point of 165°–168° C.

EXAMPLE 7

N,N'-Bis[2,4-bis{2-hydroxy-N-(2,2,6,6-tetramethyl-4-piperidyl)ethylamino}-1,3,5-triazine-6-yl]-p-xylylenediamine 2,4-Bis{2-hydroxy-N-(2,2,6,6-tetramethyl-4-piperidyl)ethylamino}-6-chloro-1,3,5-triazine (15.4 g) and p-xylylenediamine (1.4 g) were dissolved in xylene (50 ml) and the solution was heated to reflux for 5 hours. The reaction mixture was poured into ice water. After saturation with potassium carbonate, the mixture was extracted with a mixture of benzene (300 ml) and chloroform (500 ml). The extract was dried over anhydrous potassium carbonate and benzene and chloroform were distilled off. The resulting residue was treated with silica gel column chromatography (eluent=ethyl acetate:triethylamine:ethanol=3:1:1) to yield crystals, which were recrystallized from cyclohexane to give the desired product with a melting point of 151°–156° C.

EXAMPLE 8

N,N'-Bis(2,2,6,6-tetramethyl-4-piperidyl)-N,N'-bis[2,4-bis{2-hydroxy-N-(2,2,6,6-tetramethyl-4-piperidyl)ethylamino}-1,3,5-triazine-6-yl]hexamethylenediamine 2,4-Bis{2-hydroxy-N-(2,2,6,6-tetramethyl-4-piperidyl)ethylamino}-6-chloro-1,3,5-triazine (10.9 g) and N,N'-bis(2,2,6,6-tetramethyl-4-piperidyl)-hexamethylenediamine (4.0 g) were dissolved in xylene (60 ml) and the solution was heated to reflux for 16 hours and 30 minutes. n-Hexane was added to the reaction mixture and the precipitated product was collected by filtration. The crystals were placed in an aqueous ammonia solution and extracted with chloroform. The extract was dried over anhydrous potassium carbonate and chloroform was distilled off. The resulting residue was treated with alumia column chromatography (eluent=ethylacetate:triethylamine:chloroform:ethanol=10:10:5:3) to yield crystals, which were recrystallized from cyclohexane and twice from ethyl acetate to give the desired product as white crystals with a melting point of 180°–186° C.

EXAMPLE 9

N,N'N''-Tris[2,4-bis{2-hydroxy-N-(2,2,6,6-tetramethyl-4-piperidyl)ethylamino}-1,3,5-triazine-6-yl]diethylenetriamine 2,4-Bis{2-hydroxy-N-(2,2,6,6-tetramethyl-4-piperidyl)ethylamino}-6-chloro-1,3,5-triazine (16.8 g) and diethylenetriamine (1.0 g) were disolved in xylene (300 ml) and the solution was heated to reflux for 12 hours. Xylene was distilled off from the reaction mixture and the residue was treated following the procedure of Example 5. The resulting residue was treated with silica gel column chromatography (eluent=ethyl acetate:triethylamine:ethanol=3:3:5) to yield crystals, which were recrystallized from ethyl acetate to afford the desired product as white crystals with a melting point of 190°–193° C.

EXAMPLE 10

N,N',N'',N'''-Tetrakis[2,4-bis{2-hydroxy-N-(2,2,6,6-tetramethyl-4-piperidyl)ethylamino}-1,3,5-triazine-6-yl]-triethylenetetramine 2,4-Bis{2-hydroxy-N-(2,2,6,6-tetramethyl-4-piperidyl)ethylamino}-6-chloro-1,3,5-triazine (8.0 g) and triethylenetetramine (0.5 g) were dissolved in dioxane (100 ml) and to the solution was added an aqueous solution of sodium hydroxide (0.7 g) in water (10 ml). The mixture was heated to reflux for 6 hours. Dioxane was distilled off from the reaction mixture and the residue was extracted with benzene. The extract was treated with silica gel column chromatography (eluent=ethyl acetate:benzene:ethanol:triethylamine=20:4:2:1) to give the desired product as white crystals melting at 158° C.

EXAMPLE 11

N,N',N'',N''', N'''',N'''''-Hexa[2,4-bis{2-hydroxy-N-(2,2,6,6-tetramethyl-4-piperidyl)ethylamino}-1,3,5-triazine-6-yl]-pentaethylenehexamine 2,4-Bis{2-hydroxy-N-(2,2,6,6-tetramethyl-4-piperidyl)ethylamino}-6-chloro-1,3,5-triazine (3.7 g) and pentaethylenehexamine (0.2 g) were dissolved in dioxane (70 ml). After addition of potassium carbonate (4.0 g), the mixture was heated to reflux for 10 hours. Dioxane was distilled off from the reaction mixture and the resulting residue was poured into a 5% aqueous sodium hydroxide solution and extracted with ethyl acetate. The extract was dried over anhydrous potassium carbonate. Ethyl acetate was distilled off and the resulting crystals were recrystallized from a mixture of ethyl acetate and benzene (1:1) to afford the desired product as white crystals with a melting point of 185°–195° C.

EXAMPLE 12

N,N-Bis[2,4-bis{2-hydroxy-N-(2,2,6,6-tetramethyl-4-piperidyl)ethylamino}-1,3,5-triazine-6-yl]-n-dodecylamine To a solution of cyanuric chloride (38.0 g) in acetone (350 ml) was added dropwise a suspension of dodecylamine (18.5 g) in acetone (40 ml) at 10° C. After addition, the mixture was stirred for 4 hours at that temperature. The reaction mixture was poured into water (2 l) and extracted with ethyl acetate. The extract was dried over anhydrous sodium sulfate and ethyl acetate was distilled off. The resulting oil was purified with silica gel column chromatography (eluent=benzene:n-hexane=4:1) to afford N,N-bis-(2,4-dichloro-1,3,5-triazine-6-yl)-n-dodecylamine as white crystals melting at 50°–53° C.

The product (4.8 g) obtained above and 4-(2-hydroxyethylamino)-2,2,6,6-tetramethylpiperidine (10.0 g) were dissolved in dioxane (200 ml). After addition of an aqueous solution of sodium hydroxide (2.0 g) in water (20 ml), the mixture was heated to reflux for 15 hours. Dioxane was distilled off and the resulting residue was extracted with ethyl acetate. The extract was dried over anhydrous sodium sulfate and ethyl acetate was distilled off to yield crystals, which were purified with alumina column chromatography (eluent=ethyl acetate:methanol=10:1) to give the desired product as white crystals with a melting point of 106°–110° C.

EXAMPLE 13

2,4,6-Tris{2-hydroxy-N-(2,2,6,6-tetramethyl-4-piperidyl)ethylamino}-1,3,5-triazine Cyanuric chloride (3.0 g) and 4-(2-hydroxyethylamino)2,2,6,6-tetramethylpiperidine (12.0 g) were dissolved in dioxane. After addition of potassium carbonate (10.0 g), the mixture was stirred for an hour at room temperature and additionally heated to reflux for 8 hours. Dioxane was distilled off from the reaction mixture and the resulting white crystals were recrystallized from a mixture of benzene:n-hexane (2:1) to yield the desired product as white crystals with a melting point of 176°–178° C.

EXAMPLE 14

2,4,6-Tris{N-(2,2,6,6-tetramethyl-4-piperidyl)-2-lauroyloxyethylamino}-1,3,5-triazine The compound (2.0 g) obtained in Example 13 and methyl laurate (3.0 g) were dissolved in xylene (300 ml). After addition of lithium amide (0.5 g), the mixture was heated to reflux for 8 hours. During the reaction, produced methanol was distilled off together with xylene little by little while the volume of the reaction mixture was kept constant by adding xylene in the amounts of corresponding to distilled methanol and xylene.

The reaction mixture was washed with water and dried over sodium sulfate and xylene was distilled off. The resulting oil was purified with silica gel column chromatography (eluent=ethyl acetate:benzene:ethanol:triethylamine=20:4:2:1) to yield the desired product as colorless viscous oil, the Rf values of which were 0.42 in thin layer chromatography using silica gel (developer=ethyl acetate:benzene:ethanol:triethylamine=20:4:2:1).

EXAMPLE 15

2,4,6-Tris{N-(2,2,6,6-tetramethyl-4-piperidyl)-2-stearoyloxyethylamino}-1,3,5-triazine Following the procedure of Example 14, the desired product was obtained as colorless wax, the Rf values of which were 0.41 in thin layer chromatography using silica gel (developer=ethyl acetate:benzene:ethanol:triethylamine=20:4:2:1).

EXAMPLE 16

2,4,6-Tris[N-(2,2,6,6-tetramethyl-4-piperidyl)-2-{3-(3,5,-di-tert-butyl-4-hydroxyphenyl)propionyloxy}-ethylamino]-1,3,5-triazine Following the procedure of Example 14, there was obtained viscous oil, which was purified with silica gel column chromatography (eluent=ethyl acetate:triethylamine=5:1) to yield the desired product as pale yellow crystals with a melting point of 97°–100° C.

EXAMPLE 17

100 parts of unstabilized polypropylene powder (MFI ~18), 0.2 part of stearyl 3-(3,5-di-tert-butyl-4-hydroxyphenyl)propionate as an antioxidant and 0.25 part of the stabilizer of this invention were kneaded for 10 minutes at 200° C. in a Brabender-plastgraph to obtain a homogeneous material. The resulting lump was pressed to a 2-3 mm thick sheet in a laboratory press. A part of the sheet was pressed for 6 minutes at 260° C. in a hydraulic press and immediately placed in cold water to obtain a 0.5 mm thick film. Following the same procedure, a 0.1 mm thick film was shaped from the above 0.5 mm thick film. The film was cut into test specimens of 50×120 mm. The pieces were exposed to the light in a sunshine weather meter at a black panel temperature of 63±3° C. The tension tests of the exposed films were conducted at regular intervals and the times for which extension of the pieces decreased to 50% of the original one were measured. The test results are shown in Table 1: the ratio of the time for which extension of the test pieces decreased to 50% of the original one to the time for which extension of controls decreased to 50% of the original one is shown. The compound numbers represent those of the compounds exemplified at pages 5 to 7. This also applies to Tables 2 and 3.

TABLE 1

| Compound No. | Ratio | Compound No. | Ratio |
|---|---|---|---|
| 2 | 7.0 | 16 | 4.2 |
| 5 | 6.5 | 19 | 8.3 |
| 6 | 7.2 | 23 | 9.4 |
| 8 | 7.5 | 25 | 8.8 |
| 9 | 6.2 | 26 | 5.0 |
| 11 | 6.1 | 27 | 5.9 |
| 14 | 5.0 | 28 | 10.0 |
| 15 | 4.8 | 29 | 9.8 |

EXAMPLE 18

To 100 parts of polystyrene pellets (Trade Name: Styron 666, produced by Asahi Dow Co., Ltd.) was added 0.25 part of stabilizers of the present invention and the mixture was kneaded for 5 minutes at 200° C. in a Brabender-plastograph to obtain a homogeneous mixture. The resulting lump was immediately pressed to 2-3 mm thick plates in a laboratory press. The plates were pressed for 2 minutes at 180° C. to obtain 1.5 mm thick plates. The resulting plates were exposed to the light in a ASTM G26, BH type Xenon Weather-Ometer (65 WR type, produced by Atlas Co.) for 1500 hours at a black panel temperature of 63±3° C. Yellowness index of the exposed plates were measured according to the method ASTM D1925. The results are shown in Table 2.

TABLE 2

| Compound No. | $YI_0$ | $YI_{1500}$ |
|---|---|---|
| 6 | 2.3 | 10.4 |
| 9 | 2.2 | 10.3 |
| 11 | 2.0 | 10.8 |
| 14 | 2.5 | 12.1 |
| 19 | 2.4 | 9.9 |
| 23 | 2.1 | 9.6 |
| 28 | 2.6 | 11.7 |
| 29 | 2.4 | 9.5 |
| No addition | 1.9 | 37.8 |

EXAMPLE 19

100 parts of thermoplastic polyurethane (Trade Name: Parapllen Pellet 22S, produced by Nippon Polyurethane Industry Co., Ltd.) and 0.25 part of the stabilizers of this invention were dissolved homogeneously in 300 parts of dimethylformamide. The resulting solution was drawn on a glass plate into about 0.4 mm thick layer. The resulting layer plate was dried for 20 minutes at 60° C. and next for 15 minutes at 120° C. to obtain a 0.1 mm thick film. The resulting film was exposed to the light in a sunshine carbon arc weather meter for 300 hours at a black panel temperature of 63°±3° C. without spray of water. Yellowness index of the exposed films were measured according to the method ASTM D1925. The results are shown in Table 3.

TABLE 3

| Compound No. | $YI_0$ | $YI_{300}$ |
|---|---|---|
| 6 | 2.1 | 26.8 |
| 9 | 2.2 | 27.3 |
| 14 | 2.7 | 26.4 |
| 19 | 2.4 | 25.1 |
| 23 | 2.0 | 24.5 |
| 28 | 2.9 | 28.6 |
| 29 | 2.2 | 23.9 |
| No addition | 1.7 | 48.9 |

What is claimed is:

1. A s-triazine derivative having the formula

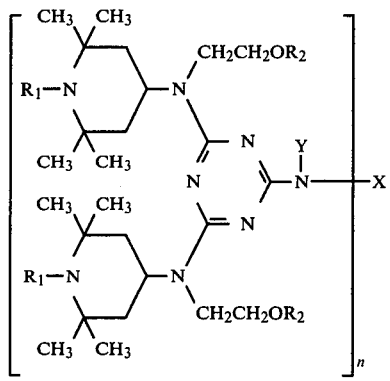 (I)

wherein $R_1$ represents hydrogen atom or methyl group, $R_2$ represents hydrogen atom, an alkanoyl group having from 2 to 18 carbon atoms or 3-(3,5-di-tert-butyl-4-hydroxyphenyl)propionyl group, n is 1 or 2, when n is 1, X represents an alkyl group having from 1 to 18 carbon atoms, benzyl group or a group of the formula —CH$_2$CH$_2$OR$_2$ (wherein R$_2$ is as defined above) and Y represents hydrogen atom, a group of the formula

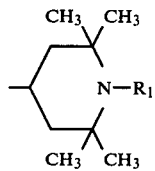 (II)

or a group of the formula

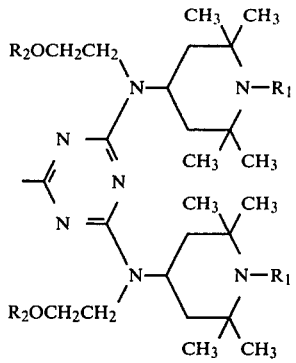 (III)

(wherein $R_1$ and $R_2$ are as defined above), when n is 2,

X represents an alkylene group having from 2 to 6 carbon atoms, xylylene group or a group of the formula

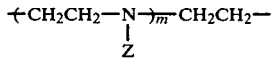

(wherein m is an integer from 1 to 4 and

Y represents a group of the above formula (III)) and

Z represents hydrogen atom or a group of the above formula (II).

2. A compound according to claim 1, wherein $R_1$ is hydrogen atom.

3. A compound according to claim 1, wherein $R_2$ is hydrogen atom.

4. A compound according to claim 1, wherein $R_1$ and $R_2$ are hydrogen atoms, n is 1, X is an alkyl group having from 8 to 18 carbon atoms and Y is hydrogen atom or 2,4-bis{2-hydroxy-N-(2,2,6,6-tetramethyl-4-piperidyl)ethylamino}-1,3,5-triazin-6-yl group.

5. A compound according to claim 1, wherein $R_1$ and $R_2$ are hydrogen atoms, n is 1, X is 2-hydroxyethyl group and Y is 2,2,6,6-tetramethyl-4-piperidyl group.

6. A compound according to claim 1, wherein $R_1$ and $R_2$ are hydrogen atoms, n is 2, X is 1,6-hexylene group of a group of the formula

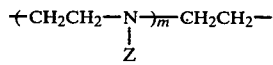

(wherein m is an integer from 1 to 4, Z is 2,4-bis{2-hydroxy-N-(2,2,6,6-tetramethyl-4-piperidyl)ethylamino}-1,3,5-triazin-6-yl group and Y is hydrogen atom.

* * * * *